Sept. 27, 1966     R. L. ABOS     3,275,735
APPARATUS FOR FORMING HIGH TEMPERATURE RESISTANT MEMBER
Original Filed Oct. 3, 1960     2 Sheets-Sheet 1

INVENTOR.
Ralph L. Abos
BY
His Attorney

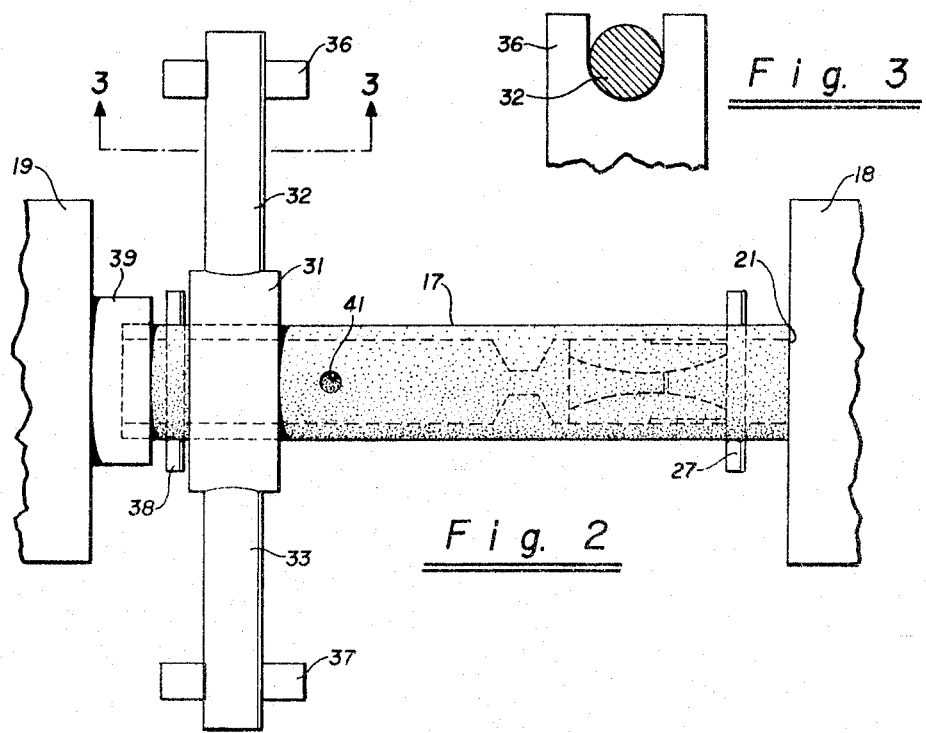
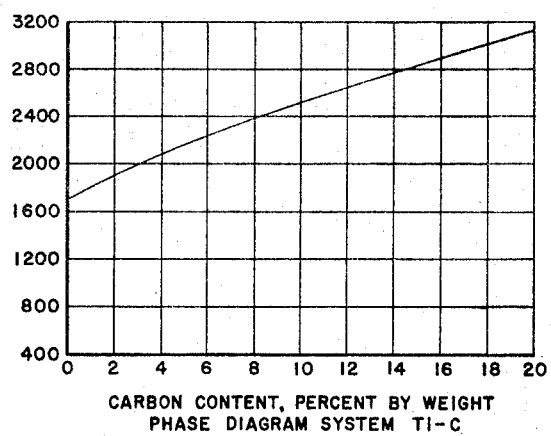
CARBON CONTENT, PERCENT BY WEIGHT
PHASE DIAGRAM SYSTEM TI-C
Fig. 5
INVENTOR.
Ralph L. Abos
*His* Attorney

United States Patent Office 3,275,735
Patented Sept. 27, 1966

3,275,735
APPARATUS FOR FORMING HIGH TEMPERATURE RESISTANT MEMBER
Ralph L. Abos, Los Angeles, Calif., assignor to Polycarbide Corporation, a corporation of California
Original application Oct. 3, 1960, Ser. No. 59,893. Divided and this application Dec. 4, 1961, Ser. No. 159,475
6 Claims. (Cl. 13—25)

The invention relates to compositions having utility in high temperature structural applications, for example, rocket nozzles, and to processes and apparatus by means of which such parts can be produced. The present application is a divisional application of parent application, Serial No. 59,893, filed October 3, 1960, for High Temperature Resistant Member and Process and Apparatus for Forming.

In the aforementioned patent application there is disclosed a composition which combines the desirable high temperature thermal shock resistant qualities of graphite with the high strength and abrasive resistant qualities of carbide. The product is particularly useful in high temperature and high pressure applications where abrasion resistant qualities are needed together with good dimensional stability, anistropy, and thermal shock resistance. The material which is the product of the invention covered in the parent application has the qualities of ductility and resistance to thermal fatigue, resistance to oxidation, superior impact strength, stress-rupture strength, tension and compression strength as well as compression modulus, the ability to take a smooth surface as by grinding or other mechanical finishing, good ablation propagation, a high coefficient of thermal transfer and low coefficient of thermal expansion for dimensional stability, and the ability to "regenerate" that is to withstand increasingly higher temperatures up to the ultimate disintegration point of the material.

An object of the present invention is to provide an apparatus by means of which the aforementioned product of the parent invention may be accurately reproduced in production with reliability with the product having a reproducibility qualifying it as an engineering material.

Another object of the present invention is to provide an apparatus of the character described which is capable of handling and compounding materials of the type described in the parent application at very high temperatures and to do so rapidly, conveniently, and precisely so that products of the character discussed may be produced with uniform and high quality physical properties.

The invention possesses other objects and features of advantage, some of which, with the foregoing, will be set forth in the following description of the preferred forms of the invention which are illustrated in the drawings accompanying and forming part of this specification. It is to be understood, however, that variations in the showings made by the said drawings and description may be adopted within the scope of the invention as set forth in the claims.

Referring to said drawings (two sheets):

FIGURE 2 is a plan view of the apparatus illustrated in FIGURE 1.

FIGURE 3 is a fragmentary cross-sectional view of a part of the apparatus as taken substantially on the plane of line 3—3 of FIGURE 2.

FIGURE 5 is a phase diagram of the titanium carbide system illustrating one of the properties of the present product.

Figure 4:
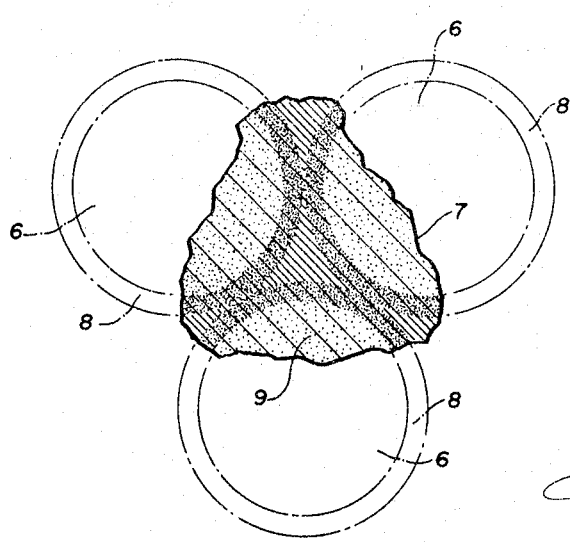
FIGURE 4 is a greatly enlarged and diagrammatic view depicting the composition of the present invention.

The composition disclosed in the parent application and as generally depicted in FIGURE 4 consists of discrete graphite particles 6 which are embedded in a surrounding metallic network or matrix 7 which surrounds and binds the particles 6 into a solid mass, the matrix 7 being formed of a carbon combining metal which will form a solid solution or alloy bond with the graphite 6. The product is further characterized as illustrated in FIGURE 4 by a transition or alloy zone 8 which surrounds each of the graphite particles and which changes in its composition throughout the full range of from pure graphite at the particles 6 to pure metal at the interstices 9 between the particles. This transition or alloy zone 8 thus provides an integrating matrix for the products and is obtained by using a metal which is either carbide forming or which will alloy with carbon to form a solid solution bond. Such materials include titanium, zirconium, hafnium, vanadium, niobium, tantalum, chromium, molybdenum, tungsten, silicon, and others.

The resulting product is metal reinforced graphite so as to take the initial shock which pure carbide or graphite is wholly incapable of doing. The carbide or alloy material vastly improves the abrasion resistance of the pure graphite. On the other hand, the graphite particles serve as a much needed heat sump and give the product thermal shock resistance qualities which the carbide material lacks.

As hereinabove noted one of the features of the present product is its ability to "regenerate" in withstanding increasingly higher temperatures. This is accomplished in the present invention by stabilizing the metallic network 8 and 9 at a point where the combined carbon is relatively low for the particular metal used, and by selecting a metal which exhibits increased temperature resistance characteristics as it takes on increased amounts of carbon. Thus, as the product is subjected to increased temperature, the metal reacts with the graphite to pick up more carbon, and in so doing increases its melting point or melting temperature. Also, this process absorbs energy so as to aid in the ability of the product to withstand the impressed heat. Metals which fall within the class which will produce a regenerative product are titanium, zirconium, hafnium, vanadium, tantalum, chromium, silicon, niobium, chromium, thorium, and uranium.

A temperature carbon content curve is illustrated in FIGURE 6 for titanium carbide which shows the wide homogeneity range from zero to 20 percent carbon content, percent by weight, with an increasing melting point from about 1725° C. to about 3100° C. over the carbon range noted. This figure is taken from page 83 of the text, Refractory Hard Metals, authored by Schwarzkopf and Kieffer, and published by MacMillan Company, 1953.

The similar temperature curve for tantalum is illustrated at page 118 of the aforementioned text wherein the temperature range extends from approximately 2800° C. at about ½ to 1 percent carbon to about 3800° C. at about 6.2 percent carbon. The hafnium-carbon temperature curve rises rapidly from about 2230° C. at about 3½ percent carbon to about 3900° C. at about 6.5 percent carbon. The curve for zirconium carbide is again similar wherein the temperature range runs from about 1860° C. to about 3500° C. from about 3 percent to about 12 percent. The characteristic temperature curve for niobium carbide extends from about 1950° C. to about 3500° C. over a carbon range of about 3 to 12 percent. The characteristic vanadium carbon curve has a temperature range of about 1715° C. to about 2830° C. over a carbon range of about 1 to 19 percent. The silicon, thorium, chromium and uranium carbide systems follow a similar upward temperature curve with increased percentage of carbon.

One of the processes of the parent application makes an important use of this increase in melting temperature with increased carbon. In this process the molten carbon combining metal is caused to flow into the porous graphite structure and as the metal flows into the interstices of the graphite body the metal forms an immediate high temperature film or envelope around the carbon particles. This envelope or film is rich in carbon and accordingly has a relatively high melting point—much higher than the liquid metal itself. Consequently, the envelope forms a path for the liquid metal to flow into and through the whole porous structure. As the metal is thus entering and filling the porous structure, alloying of the metal and carbon takes place, producing the transition zone above described.

Figure 1:
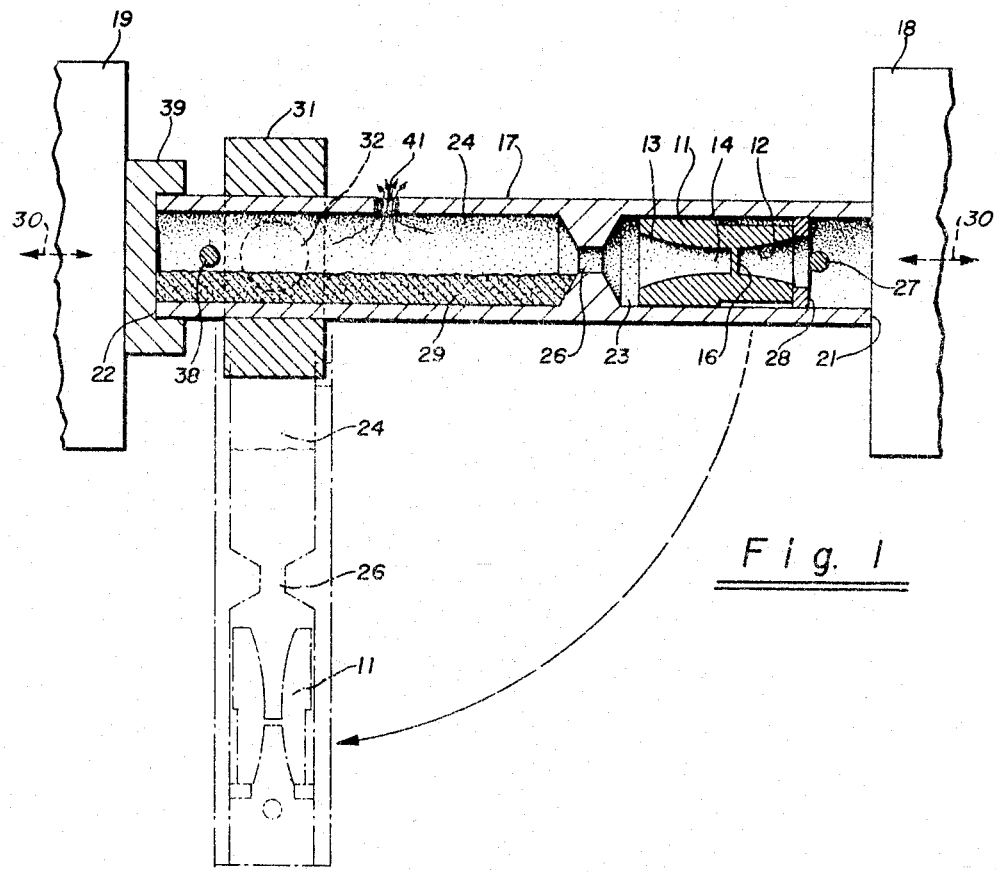
FIGURE 1 is a cross-sectional view of an apparatus embodying the present invention.

The apparatus of the present invention as illustrated in FIGURES 1, 2 and 3 of the accompanying drawing has the ability to accurately control and pre-determine the end product repetitively in technical or relatively large scale production; and has as other features relative simplicity, low cost and adaptable to automatic operation with a minimum of skill. The end product is case hardened completely through the structure with substantial uniformity and requires a minimum of further machining or processing which is very important in the case of very hard materials.

In this form of the invention, the part 11 is pre-formed from graphite as by molding or machining the part from porous graphite. This material is commercially available from National Carbon, Atcheson, Union Carbide & Carbon, and others. The part 11 is here illustrated as a rocket nozzle having an entrance passage 12 and a discharge passage 13 forming a venturi passage which necks down to a restricted orifice 14. Importantly, however, the part 11 is formed with an internal temporary web 16 which restricts the free flow of metal through the body 11 and passages 12 and 13 in the ensuing impregnating process.

The graphite body 11 is mounted within a tubular graphite crucible 17 which is in turn mounted or chucked between electrodes 18 and 19 which bear against the ends 21 and 22 of the crucible to support the latter rigidly, and preferably in the present embodiment in a substantially horizontal position, and with a firm clamping force so as to provide not only a mechanical support for the crucible, but also electrical contact pressure for feeding electric current through the crucible for heating of the contents. Preferably, the electrodes 18 and 19 are formed of graphite and are fed with an appropriate electric current as, for example, alternating current voltage of about 5 to 33 volts capable of feeding approximately 100 to 1,000 k.v.a. or more power into the crucible. The crucible 17 is here formed with connected internal chambers 23 and 24 which are connected by a restricted metal dump orifice 26. The specimen part 11 is mounted in chamber 23 between orifice 26 and a retaining pin 27 mounted crosswise through the tubular crucible 17. Preferably, a retaining support ring 28 is mounted between one end of body 11 and cross pin 27 so as to provide a full circle support for the lower end of the body during the casting or impregnating process to follow. A pre-determined charge of metal 29 is positioned in chamber 24. Any of the carbon combining or alloying metals above described may be used either singly or in combination. These metals may be deposited in chamber 24 in either powdered, or granular, or pellet, or ingot form.

In accordance with the present invention, the crucible 17 is initially supported between the electrodes 18 and 19 with the chambers 24 and 23 substantially horizontally aligned, and the crucible is maintained in this position for heating of the body 11 and melting of the metal 29. The mounting means is here arranged to subsequently disengage the crucible from the electrodes (see arrows 30 in FIGURE 1) and cause a reorienting of the crucible positioning the metal chamber 24 above the specimen chamber 23, as illustrating in phantom line in FIGURE 1 so as to cause the flow of molten metal from chamber 24 through the metal dump orifice 26 upon and over the body 11.

The tubular crucible 17 is here carried by a cross-yoke structure providing an eccentric (relative to the length of the crucible) pivotal support so that when the crucible is released by backing off or separating the electrodes 18 and 19, the crucible will automatically drop at its right hand end, as viewed in FIGURE 1, with automatic pendulent swinging action to a vertical position depending from the yoke and as illustrated in phantom line in FIGURE 1. The yoke structure here includes a yoke collar 31 surrounding the crucible 17 and which is connected to diametrically arranged shafts 32 and 33 which are carried at their outer ends in yoke swivel nests 36 and 37.

With reference to FIGURE 5, it will be seen that the yoke assembly is positioned adjacent the left-hand end of the tube so as to cause the descending movement of the right hand end 21 of the tube when released by the electrodes 18 and 19. A retaining pin 38 is mounted crosswise through crucible 17 to support the latter on the top of the yoke collar 31 when the assembly is rotated to a vertical position. Preferably, an end cap 39 is used between end 22 of the crucible and electrode 19 so as to close the metal compartment 24 and prevent the molten metal from contacting the graphite electrode 19. The retaining pins 27 and 28, the supporting yoke collar 31, shafts 32 and 33, and supporting ring 28 are desirably formed of graphite. The yoke swivel nest 36 and 37 may be formed of an asbestos base material such as transite.

When the parts are assembled as illustrated in FIGURE 1 and 2, current is fed through the crucible heating it to an incandescent white heat over a range of about 3000° F. to 6000° F. depending upon the metal used and end product desired. In accordance with the present invention and as an important feature thereof, a control point has been determined for the accurate reproduction of the parts. This control point involves a flash type gasification which seems always to occur as the molten metal is brought up to near the preferred temperature for combination with the graphite part. At the control point, the molten metal will gasify, sending a tell-tale jet of visible gas through a vent opening 41 provided in the crucible for this purpose and communicating with the metal compartment 24. This gas jet will continue for a period of a few seconds and has a rather sharp cutoff which can be used as a control point. Preferably, at this point the operation of the apparatus is turned over to an automatic timer which controls the further heating period. This additional heating period may be determined by experiment and may run from about three or four seconds to about 25 or 30 seconds following which the electrodes 18 and 19 are withdrawn to release the crucible for movement into its vertical position causing the molten metal to flow through the dump orifice 26 onto the body 11.

Preferably, a pre-determined clearance is maintained around the body 11, that is, between the body 11 and the internal wall of the crucible in the order of a 64th of an inch or so for confining the flow of molten metal over the outside periphery of the body. The molten metal will pour down through orifice 26 and into the upper end of body 11 filling and overflowing chamber 13 and causing the molten metal to flow around the outside of the body in the narrow pre-determined clearance provided. It has been found that the attraction of the metal by the graphite body under the conditions herein described that the metal is very rapidly absorbed into the porous body in a matter of a second or so. By pre-determining the amount of metal 29 to the amount which will be so absorbed by the body 11, very little metal will pass the lower end of the body. The metal flows completely out of cavity 13 and into the body so that no metal will normally appear on the surface of body 11.

The proportions of materials used will depend in a substantial measure on the porosity of the graphite body, the specific gravities of the metal or metals used, and the percentage of metal which will combine or form an amalgam or solution with the graphite. The ideal porosity of the graphite body, assuming particles of spherical shape, is approximately 48 percent, and experience has indicated that this percentage affords a starting point in the computation of proportions. It can be in each instance computed as to the amount of metal required to fill the voids of the graphite body and it has been found from experience that this amount of metal should be increased by 25 to 30 percent to provide for the quantity of metal which goes into the amalgam or solid solution bond. Accordingly, the amount of required metal to fill the specimen part may be determined by computation and experimentation so that a homogeneous product results without undesirable accumulation of metal on the surface of the product.

The simultaneous heating of the graphite body to the molten point of the metal seems to be an important step in preparing the graphite body for the immediate absorption of the molten metal. The hot graphite body is "thirsty" so to speak for the metal and acts like a sponge in sucking in the molten metal when the latter is brought into surface contact with the hot graphite body. Also, the maintaining of the hot graphite body retains the metal in molten, flowable form so that complete penetration or flow of the metal into the graphite body results, filling all of the interstices. The highly heated graphite and metal also produces the atomic diffusion between the two materials or the solid solution bond as above explained. The metallic material may be introduced into the process either as a pure metal or as an oxide or salt or other combined form. Upon elevating the temperature under a reducing atmosphere to the molten point of the metal, any of these forms would decompose and reduce affording pure molten metal for impregnating the graphite body as above noted. Where the metal and graphite body are separately heated as in this application, the metal may be purified by driving off the impurities, etc. prior to its contact with the graphite. In other words, the metal can be brought up to an ideal temperature for combination and penetration prior to the bringing together of the two parts, viz, the metal and the graphite.

The pendulent crucible apparatus of the character described may also be used wherever the handling and batch melting of high temperature melting point materials is required, for example, the metal chamber 24 may be charged with a mixture of graphite and a graphite combining metal of the type above described and the admixture heated to fusing temperature by chucking between electrodes 18 and 19 and then discharging as a molten alloy through opening 26 by releasing the crucible from the electrodes for dropping into the vertical position as depicted in phantom lines in FIGURE 1.

I claim:
1. An apparatus of the character described comprising a graphite crucible formed with an interior chamber having a discharge opening disposed above the bottom of said chamber in a first position of said crucible and disposed at the lower end of said chamber in a second position of said crucible, pivotal supporting means connected eccentrically to said crucible to provide an automatic pendulent movement from said first position to said second position, and electrodes moveable into engagement with said crucible in said first position and supporting said crucible therein for the heating of material in said chamber and being retractable to release said crucible for movement to said second position for discharge of molten material therefrom.

2. An apparatus as characterized in claim 1 for producing a high temperature resistant product wherein said crucible is formed with internal chambers connected by said discharge opening and being formed for receipt of a porous graphite body and a carbon combining metal respectively with said chambers substantially horizontally aligned in said first position for heating of said body and melting said metal and are substantially vertically aligned in said second position with said metal chamber over said body chamber for flow of molten metal upon and over said body.

3. An apparatus for producing a high temperature resistant product comprising, electrodes adapted for connection to a source of electric power, a graphite crucible adapted for clamping support between said electrodes and being formed with spaced and connected internal chambers formed for receipt of a porous graphite body and a carbon combining metal respectively, a pivotal support for said crucible permitting a horizontal aligned positioning of said chambers when clamped between said electrodes for heating of said crucible and melting said metal, said pivotal support causing a reorientation of said crucible upon release by said electrodes positioning the molten metal chamber over the chamber containing said body for flow of said molten metal upon and over said body.

4. An apparatus for producing a high temperature resistant product comprising, a pair of electrodes adapted for connection to a source of electric power and being mounted in substantially horizontally opposed position, an elongated graphite crucible adapted for endwise clamping support between said electrodes and being formed with longitudinally spaced and connected internal chambers formed for receipt of a porous graphite body and a carbon combining metal respectively and an eccentric pivotal support for said crucible permitting horizontal positioning thereof between said electrodes when clamped therebetween for heating of said crucible and melting said metal and causing an automatic pendulent swinging action of said crucible about said pivotal support upon release of said crucible by said electrodes thereby positioning the molten metal over said body for flow of said molten metal upon and over said body.

5. An apparatus as characterized in claim 4 wherein said crucible is formed with a vent opening leading from the upper side of said metal chamber in a horizontal positioning of said crucible for the release of gaseous products generated in the heating of material in said metal chamber.

6. An apparatus of the character described comprising, electrodes for connection to a source of electric power, an electric current conducting crucible adapted for clamping support between said electrodes and being formed with an interior chamber for receipt of metal to be heated and having a discharge opening, a pivotal support for said crucible permitting positioning of said discharge opening above the bottom of said chamber when said crucible is clamped between said electrodes for heating of said crucible and melting said metal, said pivotal support causing a reorientation of said crucible upon release by said electrodes positioning said discharge opening below the bottom of said chamber for discharge of molten metal from said chamber through said opening.

References Cited by the Examiner

UNITED STATES PATENTS

| | | | |
|---|---|---|---|
| 993,414 | 5/1911 | Sartori | 13—21 |
| 1,429,489 | 9/1922 | Clawson | 13—21 |
| 2,785,449 | 3/1957 | Wessel | 22—91 |
| 2,946,700 | 7/1960 | Day | 117—160 |

ANTHONY BARTIS, *Acting Primary Examiner.*

RICHARD M. WOOD, CHESTER L. JUSTUS, MAYNARD R. WILBUR, *Examiners.*

V. Y. MAYEWSKY, *Assistant Examiner.*